United States Patent [19]
Brockman et al.

[11] Patent Number: 5,345,733
[45] Date of Patent: Sep. 13, 1994

[54] TRUCK/TRAILER GAP FILL CLOSURE FOR STORAGE TERMINAL DOCK

[75] Inventors: Thomas R. Brockman, Kenton; Mark Dillon, Upper Sandusky, both of Ohio

[73] Assignee: Fairborn USA Inc., Upper Sandusky, Ohio

[21] Appl. No.: 48,174

[22] Filed: Apr. 20, 1993

[51] Int. Cl.⁵ .......................................... E04H 14/00
[52] U.S. Cl. ..................................... 52/173.2; 49/504
[58] Field of Search ........................ 52/173.2; 49/504

[56] References Cited
U.S. PATENT DOCUMENTS

| | | | |
|---|---|---|---|
| 4,038,792 | 8/1977 | McGuire et al. | 52/173.2 X |
| 4,062,157 | 12/1977 | Potthoff | 52/173.2 |
| 4,750,299 | 6/1988 | Frommelt et al. | 52/173.2 X |
| 4,873,800 | 10/1989 | Frommelt et al. | 52/173.2 |
| 5,185,977 | 2/1993 | Brockman et al. | 52/173.2 |

FOREIGN PATENT DOCUMENTS 2436518 8/1975 Fed. Rep. of Germany ..... 52/172.3

*Primary Examiner*—Carl D. Friedman
*Assistant Examiner*—Lan C. Mai
*Attorney, Agent, or Firm*—David H. Semmes

[57] ABSTRACT

A loading dock shelter with head pad assembly and hinge gap closure wherein reinforced side wing assemblies seal corner/hinge areas, as a truck/trailer backs into the loading dock, to thereby form a protective weather seal for the dock. Respective side wings for right and left portions of the shelter are cantilevered to set the wings outwardly of the door of the dock, when the dock is in use, thereby filling the gap between door jamb and truck/trailer open doors. Each attached side wing is thus extended outwardly to seal the gap between trailer and dock shelter. The semi-flexible nature of the wings permits each one to set itself against the inside of vehicular open doors, notwithstanding possible off-center positioning of the vehicle. This head pad assembly is so conformed that its effective life is extended over the norm.

1 Claim, 2 Drawing Sheets

TRUCK/TRAILER GAP FILL CLOSURE FOR STORAGE TERMINAL DOCK

BACKGROUND OF THE INVENTION

In the loading and off-loading of trucks, more specifically, tractor-trailer trucks, it is desirable to simultaneously seal the area between vehicle, terminal dock and/or shelter, against inclement weather. Likewise, it is important to provide such a combined dock seal and shelter as will be able to withstand substantial wind, weather and vehicular abuse. Accordingly, the present invention is adapted to provide at a given warehouse or building dock, a protective unit that presents a weather-resistant seal between truck/trailer and dock when the rear doors of the truck/trailer are open and parallel to sides of the vehicle. It is desirable then, that such a dock shelter not only permit complete and unobstructed trailer access, but also provide outstanding weather protection. The shelter herein is mounted along the outer perimeter of the door opening of the warehouse or terminal building. The present unit is sufficiently versatile to accommodate a truck/trailer which is out of position relative to dock center, as defined by the building construction. The dock center is determined by bumpers and dock sills which are operatively disposed, adjacent the door opening of the building.

DISCUSSION OF THE PRIOR ART

There follows a listing of the patented art as it relates to the side wing assembly for this invention:

| FROMMELT et al | 2/1/72 | Pat. No. 3,638,667 |
| --- | --- | --- |
| FROMMELT et al | 5/8/75 | Pat. No. 3,875,954 |
| FILLMAN et al | 12/28/82 | Pat. No. 4,365,452 |

In none of the afore-cited patents is the combination of applicant's head pad with side wing closure shown or described. The following description, drawings and claims define the distinctive coactive relationship of key elements of the invention.

SUMMARY OF THE INVENTION

Every time one opens a warehouse loading door to gain access to a tractor trailer, there is an exchange of inside and outside air that causes building energy loss. With an open, unsealed 8'×8' loading door, this may currently cost some thousands of dollars a year per door in heating energy loss and in excess of a thousand dollars a year per door in air conditioning energy loss. (Research reported by Plant Engineering, May 1984).

This is a loading dock shelter with closure elements wherein reinforced side assemblies seal corner/hinge areas after a truck/trailer has been backed into a loading dock, to thereby form a protective weather seal. The present closures, having cantilevered wing assemblies for right and left portions of the shelter, are each adapted to be offset and parallel to the upright door jambs of the dock. When the truck/trailer is in the dock, gaps will develop between dock door jambs to the right and left of the open door of the truck. These gaps will be of differing expanse, dependent upon the off-center disposition of the vehicle, relative to the center of the dock itself. The combination of this invention provides gap fill wings which will automatically adjust to variations in the gaps which are left and right of the open door, which overlap sides of the vehicle. Hence, the term: gap fill. To effect these functions, wings are arcuately closed inward in extension of the dock door jambs when contacted by a docking truck/trailer. Each attached wing is thus spring pressure applied toward the doors, to seal the gap between trailer and shelter. Left and right assemblies are independently moveable. Thus a seal is presented between the open doors of the truck/trailer and the dock.

DESCRIPTION OF THE PREFERRED EMBODIMENTS

A conventional terminal building usually has multiple dock doors with appropriate vehicle bumpers below the dock. The building doors may have no side frames, the respective door openings simply comprising a loading-unloading cavity in the wall, with or without a vertically sliding door. It is to such building docks that the present invention applies.

Figure 1:
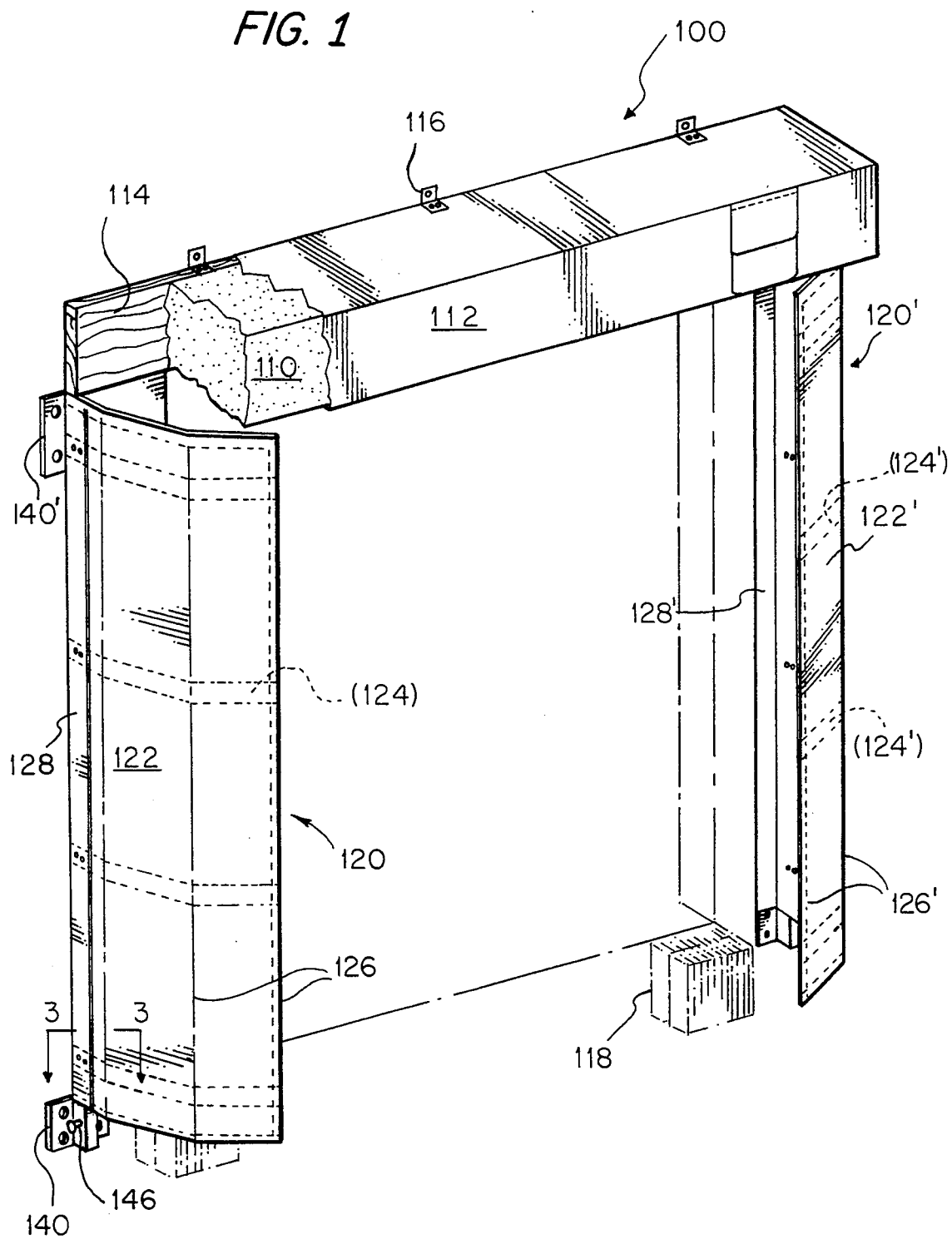
FIG. 1 is a view in perspective of a complete dock shelter with head pad and wing closures, according to the invention.

The shelter 100 of FIG. 1 comprises a new loading dock shelter, its coactive elements varying substantially from the norm. Protruding above the door of the existing building is a reinforced head pad assembly, covered by a durable protective fabric. The head pad is composed of a resilient foam which is fixed to a rigid headboard of pressure treated wood or composite material, the headboard itself being bracket anchored to the building. The unit of the shelter is, of substantial width in lateral dimension relative to the door opening of the building and greater in vertical dimension than the door of the building, its closure assemblies being building supported. Characteristically, the overall height of the shelter is thus substantially greater than the building door. The unit projects from the building at its top and bottom and preferably has a winter ready position A, FIG. 1; a summer storage position C and an optional storage position, B. See FIG. 2.

Specifically, the gap fill, wall mounted, side gap closure unit 100 has a head pad assembly 110, covered by a weatherproof DYNAFLEX (T.M.) fabric 112 which is ventilated at the bottom. The pad 110 consisting of polyurethane foam is chemically welded to a rigid headboard 114, which in turn is anchored to building brackets 116, the brackets having connection with the stringer of the door opening. The overall projection of the head pad assembly 110 exceeds the lateral projection of bumpers 118 to provide a compressible fit for the trailer to be unloaded. Immediately beneath the headboard 114 are plural wing assemblies 120-120' extending left and right from the jambs of the door opening of the building. When in use, the winter ready position A of the respective assemblies 120-120' is such as to extend them outwardly from the building, a variably greater distance than the projection of the head pad, reference FIG. 2, wherein the intermediate but operative, positioning A of the respective left and right hand wings are depicted. Summer storage positions inside and outside the building dock are depicted in phantom, the outside position C being the summer storage position and the inside position B being an optional summer storage position. Quick release pins I 4 6 delineate the relative positions, aforesaid.

Figure 2:
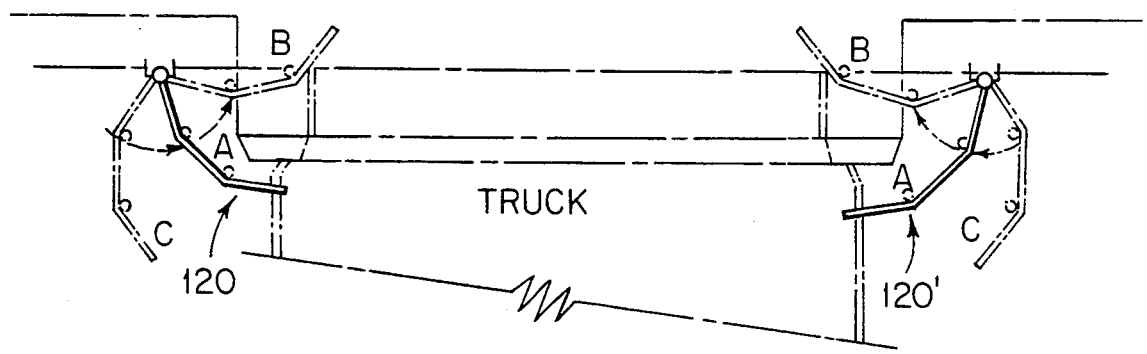
FIG. 2 is top plan, schematic view of the invention depicted in FIG. 1, illustrating the operative and inoperative modes of wing closure elements.

Referring to FIGS. 1 and 2, the side wing assemblies 120-120' each include wings 122-122', laterally stiffened by formed, resilient stays 124-124', the stays also being connected at outer ends with vertical wing element stiffeners 128-128'. These stiffeners extend the full vertical height of the wings. Vertical mounting stiffeners 126-126' likewise extend along the inside of each wing. Full vertical height fabric wipers 136-136' seal against the building face, as shown in FIG. 3.

Figure 3:
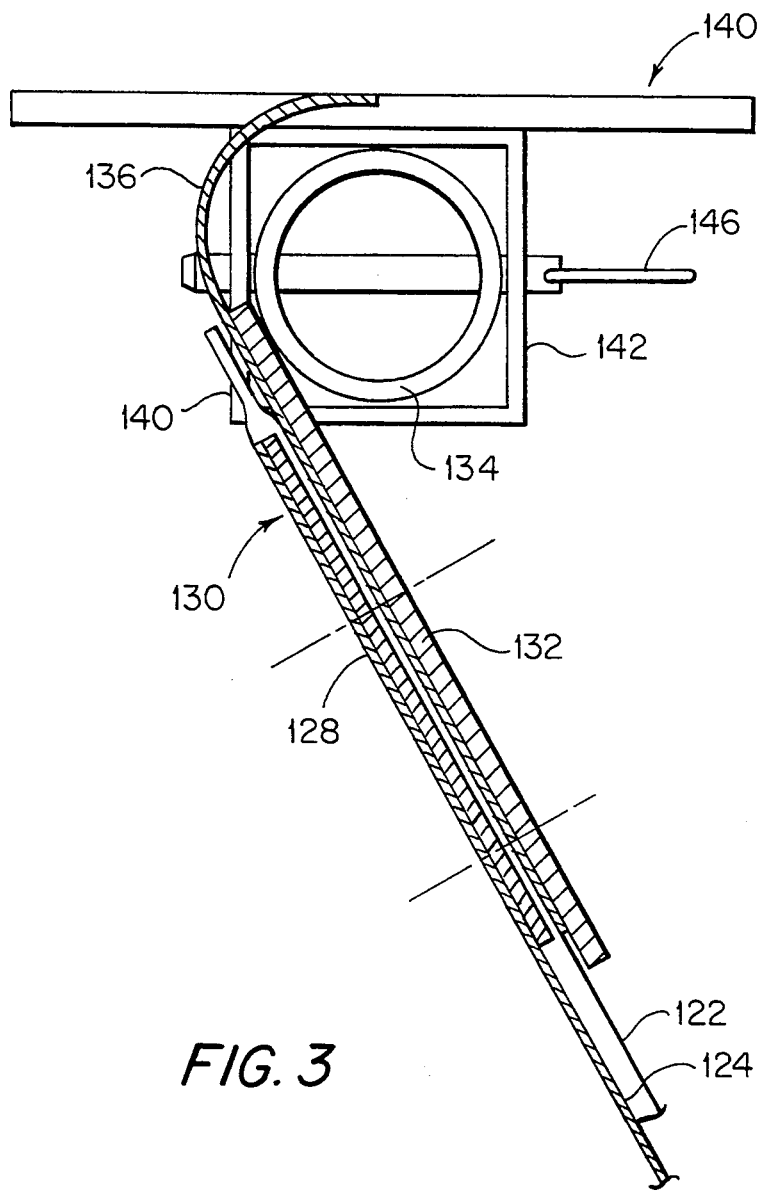
FIG. 3 is an enlarged partial view in section, depicting one wing closure unit of the FIG. 2 assembly, taken along the lines 3—3 of FIG. 1.

The wings are fastener attached to plural hinges 130-130', one such hinge being more specifically shown in FIG. 3. These hinges which are vertically aligned, each include hinge leaves 132-132' and wing pivot (tubing) hinge knuckles 134-134'. The knuckles of each hinge are adapted to ride in the lower brackets 140 and over the guide pins of upper mounting brackets 140'. Each lower bracket defines a knuckle housing 142 at the bottom of the respective wing assemblies. The lower mounting bracket is appropriately apertured to receive the hinge knuckle 134 in its lowermost portion, whereby, through setting a quick release pin 146, one may adjustably secure respective wings 120-120' in one or more of the positions shown in FIG. 2.

The invention is operative to winter ready position A from either summer positions B or C. The B position is the optional storage position and the C position, as noted, is the normal storage position, all of said wing positions being secured by setting of the FIG. 3 quick release pin in one of three incremental positions bored into the knuckle 134 and knuckle housing 142.

We claim:

1. In a warehouse building having at least one dock door within its wall to receive an open truck/trailer for loading and unloading, a wall mounted gap fill closure unit comprising:
   a) hingedly adjustable, outwardly opening lefthand and righthand side wings, each wing having a free end and a wall-mounted anchor end, the anchor end being cantilevered to the building wall, each said wing including resilient stays each of which are secured transversely to the wing in a vertically spaced apart array of the wing, the stays being further secured in position by rigidized wing stiffeners, stiffeners secured within respective wings in a longitudinal dimension at ends thereof, the stiffeners being longitudinally coextensive with a corresponding jamb of the door and the horizontal dimension of the stays in respective wings likewise being coextensive with the gap to be closed;
   b) a bracket secured to the wall and one each hinge leaf supported by the bracket for the respective wings; a knuckle connecting at a lower end to the leaf; a pull pin on the knuckle which is engageable and disengageable with said knuckle, whereby to fix the active and inactive orientation of the wings relative to the dock door;
   c) a head pas assembly coactively disposed and fixed upon the wall with respect to adjustable side wings, said head pad assembly and said wings being independently flexible, laterally, to offset vertical displacement at a loading dock.

* * * * *